United States Patent [19]

Horikawa

[11] 4,446,487
[45] May 1, 1984

[54] METHOD OF AND APPARATUS FOR READING OUT IMAGE INFORMATION

[75] Inventor: Kazuo Horikawa, Minami-ashigara, Japan

[73] Assignee: Fuji Photo Film Co., Ltd., Kanagawa, Japan

[21] Appl. No.: 365,304

[22] Filed: Apr. 5, 1982

[30] Foreign Application Priority Data

Apr. 8, 1981 [JP] Japan .................... 56-52685

[51] Int. Cl.³ ............................................ H04N 1/40
[52] U.S. Cl. ................................................ 358/280
[58] Field of Search ........................ 358/280, 294, 138

[56] References Cited

U.S. PATENT DOCUMENTS 4,148,061 4/1979 Lemelson ..................... 358/101

Primary Examiner—Joseph A. Orsino, Jr.
Assistant Examiner—Timothy K. Greer
Attorney, Agent, or Firm—Gerald Ferguson, Jr.; Joseph J. Baker

[57] ABSTRACT

Image information stored on a recording medium is read out by photoelectrically converting light obtained by two-dimensional scanning of the image information, and integrating the electric signal by use of a plurality of integrators which are sequentially actuated each time a first clock pulse determining the picture element size is input. Integration periods are set not shorter than one clock length of the first clock pulse so that they partially overlap each other. The integration output is sampled by a second clock pulse at a point of time within the overlap region of the integration periods but outside regions where the next integrator is in the integration start transient and where the currently operating integrator is reset. The integrator reset period is set to sufficiently reset each integrator and prepare for the next integration.

9 Claims, 2 Drawing Figures

METHOD OF AND APPARATUS FOR READING OUT IMAGE INFORMATION

BACKGROUND OF THE INVENTION

1. Field of the Invention

This invention relates to a method of reading out image information stored on a recording medium, in which the image information is optically scanned in two directions, the resulting emitted, transmitted or reflected light is detected and converted to an electric output signal, the output signal is then integrated for a predetermined time and subjected to a sampling process, and a picture element of the image information is read out as a sampled-value train, and an apparatus for carrying out the method. This invention is particularly related to a method of and apparatus for reading out image information, which can effectively convert a detected light even of a low intensity to an image signal.

2. Description of the Prior Art

Techniques for detecting a weak light and reading image information are required for example in the fields of medical image processing, radiation image processing, nuclear electronics, facsimile, printing plate making by use of a laser beam, or the like.

In such fields, signals are generally passed through a low-pass filter or an integration circuit before processing in order to convert the weak light to an electric signal at as high efficiency as possible.

Further, in the field of radiation image processing, it has recently been proposed to use a stimulable phosphor as an intermediate medium for radiation image recording for the purpose of improving the efficiency and accuracy of medical diagnosis. In such a system, it is particularly important that a weak light be effectively detected and converted to an electric signal with a high signal-to-noise ratio (S/N ratio) so as to obtain a reproduced radiation image of a high quality.

The above-mentioned radiation image read-out system using a stimulable phosphor as an intermediate recording medium is disclosed for example in Japanese Unexamined Patent Publication No. 11395/1981 and U.S. Pat. Nos. 4,258,264 and 4,284,889. In the system of this type, the stimulable phosphor is exposed through a human body to a radiation to have a radiation image stored thereon, the stimulable phosphor is then scanned at a high speed with a stimulating ray to cause it to emit light therefrom in the pattern of the stored image, and the light emitted from the stimulable phosphor upon stimulation thereof is photoelectrically detected and converted to an electric signal. The obtained electric signal is processed as desired to reproduce a visible image having an image quality suitable for viewing and diagnosis purposes.

In the system described above, light emitted from the stimulable phosphor upon stimulation thereof according to the stored radiation energy amount is of a very low intensity. Therefore, the electric signal obtained by the photoelectric conversion of the detected light is greatly affected by random noise (i.e. quantum noise) of the emitted light.

Accordingly, in the system described above, an optical system which can effectively guide the detected light to the photoelectric conversion system is adopted and, in addition, a low-pass filter and an integration circuit are used to improve the use efficiency of the photoelectrically converted information.

However, the low-pass filter works on the basis of the time constant of a capacitor-resistor and, consequently, presents a very real problem with regard to a signal sampling process. Namely, signal samples cannot be completely separated from each other, so that a preceding sample adversely affects the subsequent sampling output signal. Further, the use efficiency of light information is low because of low integration efficiency.

As for the integration circuit, it is essential that the integrator be reset to prepare for the next sampling. Accordingly, the electric signal corresponding to light information which is input during the resetting period cannot be integrated. More specifically, in order to sequentially integrate the input signal for a predetermined period and determine and sample the mean value or the total value of the integrated signal, it is necessary that the integrator be reset to the initial state each time the predetermined integration period runs out. However, it takes 1 to 2µs for even the most rapid switch presently available to be reset. A resetting period of this order greatly interferes with desired high-speed sampling. Thus the integration efficiency in the sampling region is low and it is impossible to improve the S/N ratio.

On the other hand, in order to maximize the integration efficiency, one might consider prolonging the integration period as much as possible within the sampling region and conducting the sampling at the end of integration, i.e. when the integrator is reset. However, if sampling is carried out to match the reset timing of the integrator, spike-like noise occurs due to the floating capacity of the reset switch and this noise adversely affects the sampling output signal. Thus, this method requires complicated and expensive circuitry and troublesome adjustment for eliminating the adverse effect of spike-like noise, and is not suitable for practical use.

SUMMARY OF THE INVENTION

The primary object of the present invention is to provide a method of and apparatus for reading out image information, which can photoelectrically convert light information at a high S/N ratio to provide a reproduced image of a high quality.

Another object of the present invention is to provide a method of and apparatus for reading out image information, which can optimize utilization of the photoelectrically converted image signal which is input to the integrator.

The specific object of the present invention is to provide a method of and apparatus for reading out image information, which can read image information by carrying out signal conversion at any sampling frequency up to a high-frequency up to that determined by the change-over transient time intrinsic to the integrator.

The above objects are accomplished by using a plurality of integrators, sequentially switching the integrators to start integration each time the first clock pulse determining the size of the picture element is input, setting the integration periods of the integrators to a value not shorter than one clock length of the first clock pulse so as to partially overlap each other, actuating the sampling of the signal from the started integrator by the second clock pulse at a point of time within the overlap region of the integration periods but outside the regions where the next integrator is in the switching transient state to integration start mode and where said started integrator is reset, and determining the reset state holding period of each integrator so that each integrator is sufficiently reset to prepare for the start of the next integration.

DESCRIPTION OF PREFERRED EMBODIMENTS

The present invention will hereinbelow be described in further detail with reference to the accompanying drawings.

Figure 1:
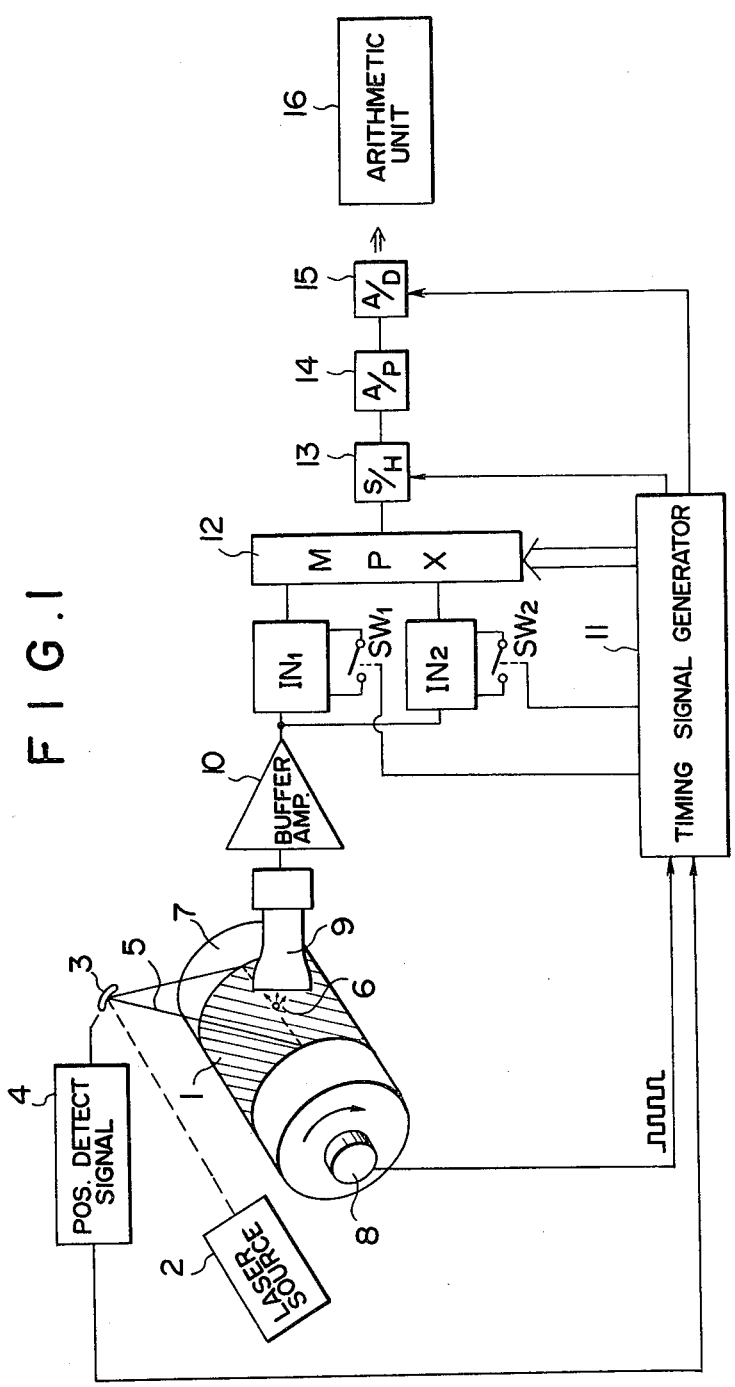
FIG. 1 is a block diagram showing an embodiment of the apparatus in accordance with the present invention.

FIG. 1 shows an embodiment of the radiation image read-out apparatus in accordance with the present invention.

In FIG. 1, a radiation image stored on a stimulable phosphor sheet 1 is scanned in two directions with a stimulating ray 5 from a laser source 2 via a scanning mirror 3. The stimulable phosphor sheet 1 is driven by a rotating drum 7. Light 6 emitted from the stimulable phosphor sheet 1 upon stimulation thereof is guided to a photodetector 9 by a light collecting means (not shown) capable of effectively collecting light. The emitted light 6 is photoelectrically converted to time-series electric image signal corresponding to the amount of radiation energy stored on the stimulable phosphor sheet 1. The electric output signal obtained from the photodetector 9 contains the random noise of the emitted light 6 and is input to two parallel-connected integrators IN1 and IN2 via a buffer amplifier 10. The integrators IN1 and IN2 are provided with reset switches SW1 and SW2, respectively.

These two integrators are controlled by a timing signal generating means 11 so as to convert the detected image signal in a manner appropriate for reading out. The timing signal generating means 11 receives the signal input from a rotation angle detecting rotary encoder 8 engaged with the cylindrical rotating drum 7 which holds the stimulable phosphor sheet 1 thereon and moves it in the sub-scanning direction for read out. The timing signal generating means 11 is also fed with a signal input from a position detecting signal generating means 4 which detects the position of the stimulating ray 5. Based on these input signals, the timing signal generating means 11 generates output signals for controlling the change-over of the reset switches SW1 and SW2 for the integrators IN1 and IN2, respectively, and other necessary timing signals. The output ends of the integrators IN1 and IN2 are connected with an analog multiplexer 12 which collects data by quickly sampling the integration output signals for respective picture elements, followed by a sample holding circuit 13, an analog signal processing amplifier 14 and an analog-to-digital converter (A/D converter) 15. Digital image signals converted and extracted by these circuits are then sent to an arithmetic processing unit 16 via a memory device such as magnetic tape for the purpose of processing the data so as to obtain a radiation image permitting high diagnostic efficiency and accuracy. In this way, the digital signals are converted to desired image signals by the arithmetic processing unit 16 and used for the reproduction of radiation image information. In the embodiment shown in FIG. 1, a photomultiplier is used as the photodetector 9.

The above-mentioned timing signal generating means 11 has various components described below. First, it has a circuit for generating and supplying a first clock pulse, i.e. an integration start clock, which alternately switches the integrators IN1 and IN2 having the reset switches SW1 and SW2, respectively, from reset state (reset holding mode) to integration holding state (integration mode) in synchronization with clock timing of a predetermined picture element resolving frequency. Second, the timing signal generating means 11 has a circuit for setting the integration mode holding time which sets the integration times of the integrators IN1 and IN2, respectively, to values not less than the one clock length of the above-mentioned integration start clock. The generating means 11 is also provided with a circuit for generating and supplying a reset signal to each of the integrators IN1 and IN2 at the ends of their integration mode holding times, and a sampling timing setting circuit capable of timing the signal sampling from each integrator to a desired point of time within the integration time extending from the end of one clock length of the above-mentioned integration start clock to the start of the other integrator. Finally, the timing signal generating means 11 also has a circuit for generating and supplying a second clock pulse (sampling command clock) to sample the integrator outputs in accordance with the timing set by the aforesaid sampling timing setting circuit.

In the above-mentioned circuit for generating and supplying the integration start clock, the sampling clock frequency is divided in half by a ½ frequency divider. A signal for starting the integrator IN1 is generated when the frequency-divided wave rises, and that for starting the integrator IN2 is generated when the frequency-divided wave falls.

In the embodiment described herein, four one-shot-multivibrators are used to set the integration mode holding time, generate and supply the reset signals and the sampling command clock pulses. They are triggered by the aforesaid integrator start signals. The timing signal generating means 11 in FIG. 1 also embraces other necessary circuits such as a reference clock generator, and circuits for generating signals for timing the sample hold control, multiplexer control and A/D conversion control based on the reference clock pulse, rotary encoder output and position detection signal.

The above-described one-shot-multivibrators alternately switch the integrators IN1 and IN2 in such a manner that their integration mode holding periods overlap each other for a predetermined time. The one-shot-multivibrators also send a sampling command with a predetermined time lag with respect to the integration start clock, and appropriately output timing signals for the analog multiplexer, sample holding and A/D conversion.

Integration outputs obtained from the integrators IN1 and IN2 are selectively picked up from the analog multiplexer 12, held as samples and A/D converted in an appropriately timed manner.

The analog signal processing amplifier 14 in FIG. 1 conducts log-conversion, gamma ($\gamma$) conversion, non-linear conversion or the like as required when the read image signal is reproduced into the final image on a photographic film or a cathode ray tube.

Operations of the embodiment in accordance with the present invention shown in FIG. 1 are hereinbelow described.

Figure 2:
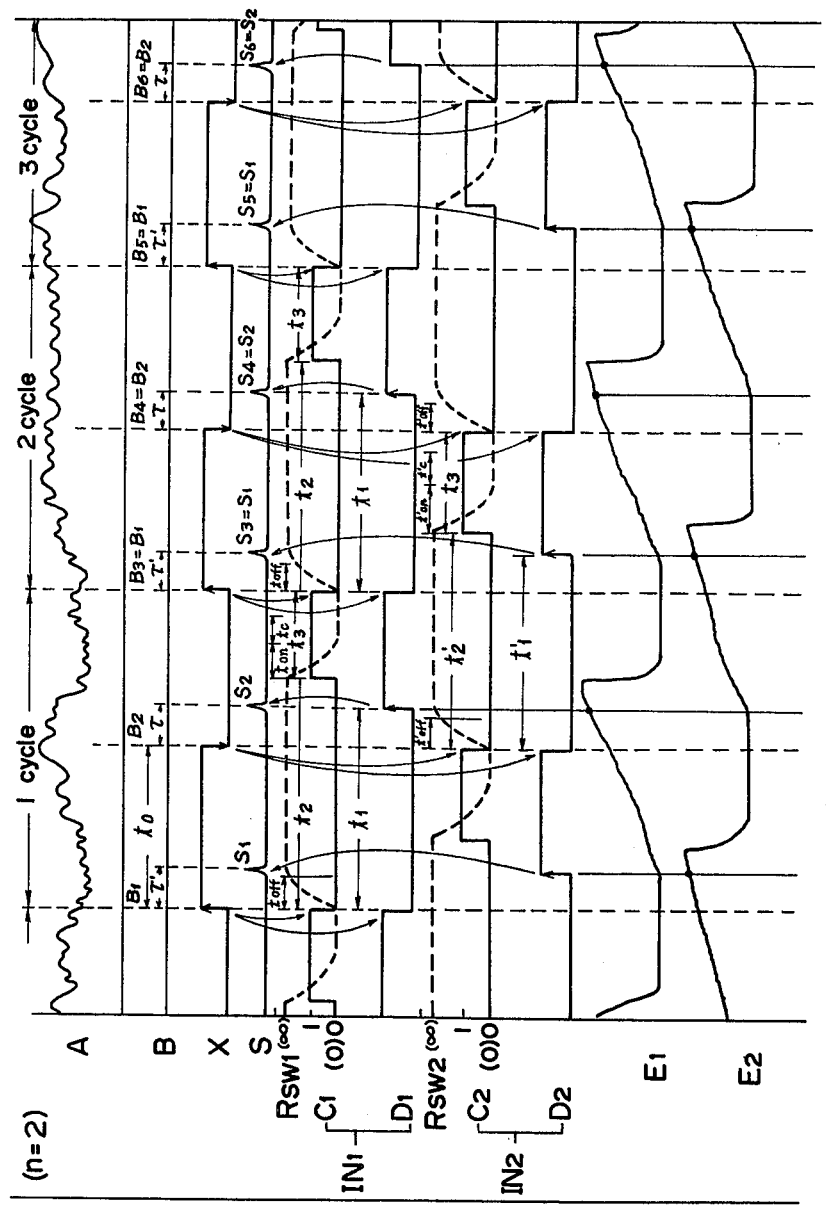
FIG. 2 is an explanatory timing chart showing the operations of the embodiment shown in FIG. 1.

FIG. 2 is a timing chart showing the sampling operations of the embodiment shown in FIG. 1. In FIG. 2, reference character A designates the signal waveform detected by the photoelectric converter 9 and containing random noise, and B designates the first clock having a reference frequency. The frequency of the first clock B is divided in half to obtain a wave X. The integrator IN1 is started when the wave X rises, and integrator IN2 is started when it falls. Reference character S designates the second clock, i.e. the sampling command clock.

Waves C1, D1 and C2, D2 are output from four one-shot-multivibrators built in the timing signal generating means 11. The 0 state of waves C1 and C2 corresponds to the integration mode holding periods of the integrators IN1 and IN2, while the 1 state thereof corresponds to the integration reset periods. Dotted waves RSW1 and RSW2 respectively superposed on waves C1 and C2 indicate the resistance values of the reset switches SW1 and SW2, respectively. As shown by the waves RSW1 and RSW2, when the waves C1 and C2 are changed over to the integration start command mode, the resistance values of the integrator reset switches do not instantly change from zero to the infinity ($\infty$). Similarly, when waves C1 and C2 are switched from the 0 state to the 1 state and the integrators IN1 and IN2 receive the reset state holding command, the resistances of the integrator reset switches gradually change from the infinity to zero.

Waves D1 and D2 generate the sampling clocks to issue the commands for sampling the outputs of the integrators IN1 and IN2 when the respective waves rise from 0 to 1. Reference characters E1 and E2 respectively designate the waves of the integration outputs obtained from the integrators IN1 and IN2 having the reset switches. The black dots in FIG. 2 denote two sampling points corresponding to the rises of the one-shot-multivibrator output pulses D1 and D2. Reference character n denotes the number of integrators with reset switches (n=2 in the embodiment shown), and t0 designates the period of the aforesaid first reference clock. Reference characters t1 and t1' each designate pulse widths of the one-shot-multivibrator outputs which determine the points of time for sampling the outputs of the integrators IN1 and IN2, respectively, and t2 and t2' denote pulse widths of the outputs of the one-shot-multivibrators which determine the integration mode holding times of the integrators IN1 and IN2, respectively.

The above-described pulse widths of the respective one-shot-multivibrators can be varied as desired. Pulse widths t3 and t3' denote the reset state holding times of the integrators IN1 and IN2, respectively. Reference characters $\tau$ and $\tau'$ designate delays between the aforesaid first integration start clock and the second sampling clock, and $t_{off}$ and $t'_{off}$ designate the switching transient times elapsing from when the integrators IN1 and IN2 having reset switches receive the integration start signal to when their reset switches open to start integration. Switching transient times $t_{on}$ and $t'_{on}$ denote the times required for the reset switches to close and start integration after the integrators IN1 and IN2 having reset switches receive the integration reset signal.

When the integrators IN1 and IN2 are in the reset mode, times $t_c$ and $t'_c$ are required for the integrated electric charges to discharge so as to return the integrators to the initial condition before integration. Time $t_r$ required for the integrator IN1 to be reset sufficiently is $$t_r = t_{on} + t_c$$

Time $t'_r$ required for the integrator IN2 to be reset sufficiently is $$t'_r = t'_{on} + t'_c$$

Operations shown by the timing chart in FIG. 2 are hereinafter described with respect to the time elapsed (horizontal axis of the timing chart).

When the first clock pulse is issued at B1, the outputs C1 and D1 (for controlling the integrator IN1) of the two one-shot-multivibrators (hereinafter abbreviated as multivibrator) started when the output wave X from the frequency dividing circuit rises are switched from 1 to 0 so as to form square pulse output waves whose pulse widths are set to t2 and t1 respectively by the predetermined time constants, and then return to the 1 state. When the multivibrator output C1 is set to 0, the reset switch SW1 of the integrator IN1 is opened and holds its open state. When the output C1 is set to the 1 state, the reset switch SW1 is closed. When the multivibrator output D1 is returned from 0 to 1, the second clock pulse S2 is sent to sample the integration output of the integrator IN1.

The second clock pulse S2 for sampling is generated t1 after the first clock B1 is input, and the sampling timing is set to satisfy the condition $$t_1 = t_0 + \tau, \tau \geq t'_{off}$$

where $$\tau + t_0 < t_2$$

Namely, the integration output is sampled from the integrator IN1 at a point of time delayed by $\tau$ from the clock B2 next to the first clock B1 which starts the integrator IN1. Because sampling of the output of the integrator IN1 is conducted under these conditions, the integrator IN1 can accomplish stable integration of the signal which is input thereto during the transient state period ($t'_{off}$) of the integrator IN2 switched to the integration mode at the point of time of the clock B2. Further, sampling of the output of the integrator IN1 occurs before it is reset at the end of its integration mode holding period t2. Accordingly, integration by the integrator IN1 and sampling of the integration output can be finished without being affected by spike-like noise which would otherwise occur due to the floating capacity of the reset switch SW1 of the integrator IN1 while the switch SW1 is being closed for the time $t_{on}$. Because the time $\tau - t'_{off}$ is extremely short, no appreciable problem arises from the double integration of the same input signal A by both integrators IN1 and IN2, which occurs during that time.

After the integration output of the integrator IN1 is sampled at S2, integration of the input signal A is conducted by the second integrator IN2 which has been stabilized in the integration mode by the first clock B2. Accordingly, the result of integration is not affected by spike-like noise occurring when the integrator IN1 is reset. Thereafter, the integrator IN1 is sufficiently reset to the original state and can get ready for the integration because its reset mode holding time t3 is longer than $t_{on} + t_c$ where $t_c$ designates the time constant for discharging the charges integrated and accumulated by the integrator IN1. In the embodiment described herein, one cycle time of the integrator IN1, i.e. the time during which the reset switch SW1 is kept in the integration state (integration mode holding period) plus the time during which it is held in the reset state (integration reset mode holding period), equals 2t₀ since two integrators are switched and used alternately. Thus one cycle of the integrator IN1 finishes at the first clock B3, followed by the second cycle.

As described above, the value τ may be set so that the time $\tau - t'_{off}$ is somewhat long within the range of $\tau + t0 < t2$. However, it should not be set in such a way that the time $\tau - t'_{off}$ is excessively long and double integration of the same input signal A simultaneously conducted by both integrators IN1 and IN2 during that time adversely affects the isolation between sample values and quality of the reproduced image.

The integration output wave obtained by the operation of the integrator IN1 is shown by the wave E1 in FIG. 2.

Further, when the first clock is issued at B2 in FIG. 2, the waves C2 and D2 of the two multivibrators for the integrator IN2 are switched from the 1 state to the 0 state by the trigger signal generated when the frequency divider output wave X falls. As a result, the waves C2 and D2 form square wave pulse outputs having the predetermined pulse widths t2' (corresponding to the integration mode holding time of the integrator IN2) and t1' (corresponding to the setting time of integration output sampling timing of the integrator IN2) in the same manner as waves C1 and D1 for the integrator IN1. Thereafter, the waves C2 and D2 return to the 1 state. When the wave C2 is set to 0, the reset switch SW2 of the integrator IN2 is opened $t'_{off}$ after the clock B2 is input thereto and maintains the integrator IN2 in the integration state for the time t2'.

In this case, too, integration of the input signal A is borne by the integrator IN1 for the time $t'_{off}$ after the input of the clock B2, and the integration output thereof is sampled by the subsequent sampling command clock S2. After the sampling pulse S2 is issued, integration of the input signal A is borne by the integrator IN2. At the point of time when the pulse S2 is generated, the integrator IN1 is still in the integrating condition and is not reset. Accordingly, the sampled integration output is not affected by spike-like noise due to the floating capacity of the switch SW1, and the input signal A can efficiently be integrated by a combination of the two integrators in the course of the set period t1' without being adversely affected by noise occurring at one of these integrators due to switching thereof.

The setting time t2' and reset period t3' of the multivibrator C2 and the setting time t1' of multivibrator D2 are set in the same manner as those for the integrator IN1. Namely, the time t1' elapsing from when the clock B2 is input to when the integration output of the integrator IN2 is sampled is set to satisfy the condition $$t1' = t0 + \tau', \tau' \geq t_{off}$$

The integration mode holding time t2' for the integrator IN2 is set to satisfy the condition $$t2' > t1',$$
$$t3' = 2t0 - t2' \geq t_r'(t_r' = t'_{on} + t'_c)$$

Generally, the time t1 is set equally to t1', and the time τ to τ'. However, they may be varied as desired provided that they satisfy the above-described conditions.

As described above, the first integration start clocks B1 and B2 are input to the integrators IN1 and IN2, and the signal A which is input between the time τ' after B1 and the time τ' after B3 is sequentially integrated by the two integrators which are actuated alternately. The respective integration outputs are sampled at S2 and S3 to yield two sampled values. The output wave of integration conducted by the integrator IN2 is shown by E2.

As already mentioned above, after the integration output of the integrator IN1 is sampled by the sample command S2, the integrator IN1 is held in the reset state and waits for the next integration start command. When the first clock is then input thereto at B3, the integrator IN1 completes its one operation cycle and is switched to the integration mode holding state of the second cycle. On the other hand, the command clock S3 is generated to sample the output of the currently operating integrator IN2 at an appropriate point of time τ' after the clock B3, namely at a time after the opening transient interval $t_{off}$ of the reset switch SW1 runs out. Thereafter, the integrator IN2 is maintained in the reset condition for a sufficiently long period t3' and waits for the next integration start clock B4.

In the same way as described above, the clock B3 simultaneously actuates the multivibrators C1 and D1 of the integrator IN1, and thereafter the multivibrator D1 outputs a command clock S4 to sample the integration output of the integrator IN1 when the predetermined time t1 elapses after the clock B3 is input thereto.

Thereafter, the first clock is generated at B4 to switch the integrator IN2 to the integration mode holding period of the next cycle and activate the multivibrator D2 which times the sampling command S5 for sampling the integration output of the integrator IN2. The sampling command S4 for the integrator IN1 is generated τ after the clock B4 is input thereto, and soon the integrator IN1 is switched to the reset holding mode and waits for the next clock B5. In this way, the above-described operations are repeated.

In the present invention, two or more integrators are activated alternately. When two integrators are used, the input signal supplied during the integration start transient period and the reset period of one integrator is input to the other integrator. Further, the integration output of each integrator is sampled after the integration start transient period of the other integrator, which is activated for integration by a pulse issued one clock after the former integrator is actuated for integration, but before the former integrator to be sampled is reset. Accordingly, the integration output can be sampled in such a way that the integration efficiency for a continuously input signal is nearly 100% for any picture element resolving frequency 1/t0 within the range below the high-frequency region where the value t0 ($> t_{off}$) approaches $t_{off}$. In addition, it is possible to minimize the adverse effect of noise contained in the input signal.

The reset periods t3 and t3' are preferably selected to satisfy the condition $$t3\ (t3') \geq t_{on}\ (t'_{on}) + 7CR$$

wherein C denotes the integrating capacitor capacity of each integrator, and R denotes the reset switch on resistance, because in this case the residual electric charges can be attenuated to a level of about a quarter or below so as to prepare for the next integration.

In the embodiment described above, one-shot-multivibrators are used as the integrator mode control and sampling pulse control circuits. However, these circuits may be constructed for example by a means in which a square wave pulse having a duty factor of 50% is generated from the aforesaid first reference clock, the integration time is set equally to a 1.5 clock length (from the rise of pulse to the fall after the next), and integration is reset with the remaining 0.5 clock length (from the fall to the rise of pulse). Further, the circuitry from the multiplexer to the A/D conversion in the above-mentioned embodiment may be replaced for example by an A/D conversion control system using a special computer.

The number n of integrators may be set to any integer within the range satisfying the above-described conditions. However, the number n should be minimized to simplify the circuitry construction.

Now the improvement in the S/N ratio achieved by the present invention is described below.

In an apparatus of the type described herein, the following equations hold:

signal = $N$/sampling period noise = $\sqrt{N}$ wherein N denotes the number of light quanta. Therefore $S/N = N/\sqrt{N} = \sqrt{N}$ The number of light quanta caught during the sampling period is eN wherein e is the integration efficiency. And the S/N ratio is $S/N = e\, N/\sqrt{eN} = \sqrt{eN}$ When the integration efficiency is 100% (e=1), the S/N ratio equals $\sqrt{N}$. Accordingly, in accordance with the present invention, the S/N ratio is improved by the factor of $\sqrt{N}/\sqrt{eN} = 1/\sqrt{e} (>1)$ times compared with the conventional method in which e<1.

In radiation image read-out apparatuses, the sampling frequency is generally within the range of from 10 to 500 kHz. When it is within the most frequently adopted range of from 50 to 200 kHz and the response delay time of the reset switch of the integrator is 2μs, the integration efficiency e is e≈0.9 to 0.4

Therefore, the S/N ratio is improved by a factor within the range of 5% to 50% in accordance with the present invention.

Further, in the present invention, signals are sampled without being adversely affected by spike-like noise occurring in the integration output due to the floating capacity of the reset switch when it is closed at the end of the integration mode. This eliminates the necessity of using and adjusting circuitry for absorbing and preventing the floating capacity of the reset switch in synchronization with the switching, and greatly improves the productivity of the radiation image read-out apparatus.

As described above, the present invention makes it possible to accomplish signal conversion at a high S/N ratio and effectively read out the image information contained in the signal detected from the image recording medium by minimizing the adverse effect of random noise contained in the detected signal, if any, and by eliminating spike-like noise occurring due to switching of the reset switches.

I claim:

1. A method of reading out image information stored on a recording medium by detecting and photoelectrically converting emitted, transmitted or reflected light obtained from optical two-dimensional scanning of the image information on the recording medium, integrating the photoelectrically converted output signal according to a predetermined clock, and sampling the integration output, thereby reading out each picture element of the image information, which method comprises using a plurality of integrators, sequentially switching said integrators to start integration each time a first clock pulse determining the size of said picture element is input, setting the integration periods of said integrators to a value not shorter than one clock length of said first clock pulse so as to partially overlap each other, actuating the sampling of a signal from the started integrator by a second clock pulse at a point of time within the overlap region of the integration periods but outside the regions where the next integrator is in the switching transient state to integration start mode and where said started integrator is reset, and determining the reset state holding period of each integrator so that each integrator is sufficiently reset to prepare for the start of the next integration.

2. A method as defined in claim 1 wherein "n" integrators having reset switches are used as said plurality of integrators, wherein n is an integer not smaller than 2, said "n" integrators are sequentially switched to start integration each after a delay of one clock period from the start of the preceding integrator each time said first clock pulse is input thereto, one operation cycle of each integrator comprising integration and reset is repeated at intervals of "n" clock periods, the integration mode holding period of each integrator is set to a value longer than said one clock length, the integration mode holding period of the i'th integrator is partially overlapped with that of the i+1'th integrator which is to be started for integration next after said i'th integrator, wherein i is an integer within the range of 1 to n, sampling of the integration output of said i'th integrator is conducted by the second clock generated after a delay of τi from said first clock which starts the i+1'th integrator, said sampling of the integration output of said i'th integrator being timed by said time τi so as to occur within a part of said overlap period other than the reset switch off delay time $(t_{off})i+1$ of the i+1'th integrator and the reset time of the i'th integrator in such a manner that the signal input during the period $\tau i - (t_{off})i+1$ is double integrated by both the i'th and i+1'th integrators, whereby adverse effects on the read-out image information are substantially eliminated.

3. A method as defined in claim 1 or 2 wherein two integrators are used.

4. A method as defined in claim 1 or 2 wherein the frequency of said sampling is 50 kHz or higher.

5. A method as defined in claim 1 or 2 wherein said recording medium is a stimulable phosphor.

6. An apparatus for reading out image information stored on a recording medium by detecting and photoelectrically converting emitted, transmitted or reflected light obtained from optical two-dimensional scanning of the image information on the recording medium, integrating the photoelectrically converted output signal according to a predetermined clock, and sampling the integration output, thereby reading out each picture element of the image information, which apparatus comprises "n" integrators having reset switches and connected with a signal input terminal in parallel to one another, wherein n is an integer not smaller than 2, an integration start signal generating and supplying means for sequentially supplying the integration start signal to respective integrators at intervals of "n" clock period each after a delay of at least one clock length from the start of the preceding integrator at least based on the clock signal of a predetermined frequency, an integration mode holding time setting means capable of setting the integration mode holding time of each integrator to a value longer than one clock length, an integrator reset signal generating and supplying means for supplying a signal to reset each integrator at the end of said integration mode holding time and maintain it in the reset mode for a sufficient length of time, and a sampling pulse generating means which can set the sampling of the integration output of each integrator to a point of time after one clock length plus the reset switch off delay time of said integrator elapses from when the integration start signal is given to said integrator and which generates a sampling command at said point of time.

7. An apparatus as defined in claim 6 wherein the number n of integrators is 2.

8. An apparatus as defined in claim 6 wherein the frequency of said sampling is 50 kHz or higher.

9. An apparatus as defined in claim 6 wherein said recording medium is a stimulable phosphor.

* * * * *